US011113411B2

(12) United States Patent
Embiricos et al.

(10) Patent No.: US 11,113,411 B2
(45) Date of Patent: Sep. 7, 2021

(54) AUTHENTICATION SECURITY MODEL FOR A CONTENT MANAGEMENT SYSTEM

(71) Applicant: Dropbox, Inc., San Francisco, CA (US)

(72) Inventors: Alexander Embiricos, San Francisco, CA (US); Matt Broussard, San Francisco, CA (US); Willy Wu, San Francisco, CA (US); Jennifer Lee, San Francisco, CA (US); Igor Kofman, San Francisco, CA (US); Micah Sivitz, San Francisco, CA (US); AJ Palkovic, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 607 days.

(21) Appl. No.: 15/789,814

(22) Filed: Oct. 20, 2017

(65) Prior Publication Data
US 2019/0121994 A1 Apr. 25, 2019

(51) Int. Cl.
*G06F 7/04* (2006.01)
*G06F 21/62* (2013.01)
*H04L 29/06* (2006.01)

(52) U.S. Cl.
CPC ........ *G06F 21/6218* (2013.01); *H04L 63/083* (2013.01); *H04L 63/0861* (2013.01)

(58) Field of Classification Search
CPC ...... G06F 21/6272; G06F 21/31; G06F 21/10; G06F 21/12; G06F 21/30; G06F 21/60; G06F 21/62; G06F 21/604; G06F 21/6218; G06F 21/645; G06F 2221/2115; H04L 63/0823; H04L 63/083; H04L 63/0861; H04W 12/06; H04W 12/084

USPC .......................................................... 726/7
See application file for complete search history.

(56) References Cited

U.S. PATENT DOCUMENTS

| 5,623,655 | A  | 4/1997 | Chisaka |
| 6,038,598 | A  | 3/2000 | Danneels |
| 6,360,250 | B1 | 3/2002 | Anupam et al. |
| 8,185,737 | B2 | 5/2012 | Isaacs et al. |
| 8,224,934 | B1 | 7/2012 | Dongre et al. |

(Continued)

FOREIGN PATENT DOCUMENTS

| WO | 2017/048496 A1 | 3/2017 |
| WO | 2017/119923 A1 | 7/2017 |

OTHER PUBLICATIONS

Wu et a, Design and Implementation of Cloud API Access Control Based on OAuth, IEEE, Apr. 19, 2013, pp. 485-489.*

(Continued)

*Primary Examiner* — Luu T Pham
*Assistant Examiner* — Jenise E Jackson
(74) *Attorney, Agent, or Firm* — Polsinelli PC

(57) ABSTRACT

The disclosed technology relates to a system configured to obtain external credentials for a user account external to a content management system, wherein the external credentials are associated with a content item stored on the content management system. The system receives, from a client device, a client request for data associated with the external user account and transmits, to an external source, a proxy-request for the data associated with the external user account, wherein the proxy-request comprises the external credentials. The system further receives the data associated with the external account and transmits the data associated with the external account to the client device.

21 Claims, 9 Drawing Sheets

(56) References Cited

U.S. PATENT DOCUMENTS

| | | | |
|---|---|---|---|
| 8,250,082 B2 | 8/2012 | Gwozdz et al. | |
| 8,402,115 B2 | 3/2013 | Franco et al. | |
| 8,484,561 B1 | 7/2013 | Lemonik et al. | |
| 8,769,012 B1 | 7/2014 | Shah et al. | |
| 8,904,538 B1 | 12/2014 | Glick et al. | |
| 8,965,988 B1 | 2/2015 | Negahban et al. | |
| 9,098,385 B2 | 8/2015 | Inoue et al. | |
| 9,098,719 B2 | 8/2015 | Anderson et al. | |
| 9,106,690 B1 | 8/2015 | Banga et al. | |
| 9,336,209 B1 | 5/2016 | Gupta et al. | |
| 9,398,017 B1 | 7/2016 | Nizametdinov et al. | |
| 9,535,909 B2 | 1/2017 | Masse et al. | |
| 9,805,207 B1 | 10/2017 | Nijim et al. | |
| 9,826,017 B1 | 11/2017 | Goldfeder | |
| 9,959,405 B2 | 5/2018 | Yancey et al. | |
| 10,110,390 B1 | 10/2018 | Nguyen et al. | |
| 10,257,281 B2 | 4/2019 | Appleyard et al. | |
| 10,318,543 B1 | 6/2019 | Sharifi | |
| 2001/0056422 A1 | 12/2001 | Benedict et al. | |
| 2003/0164853 A1 | 9/2003 | Zhu et al. | |
| 2004/0153385 A1 | 8/2004 | Allibhoy | |
| 2008/0005126 A1 | 1/2008 | Sankaran et al. | |
| 2008/0244740 A1 | 10/2008 | Hicks et al. | |
| 2008/0288349 A1 | 11/2008 | Weisberg et al. | |
| 2009/0234953 A1 | 9/2009 | Braslavsky | |
| 2009/0276829 A1 | 11/2009 | Sela et al. | |
| 2009/0320119 A1 | 12/2009 | Hicks et al. | |
| 2010/0153693 A1 | 6/2010 | Stall et al. | |
| 2010/0250653 A1 | 9/2010 | Hudgeons et al. | |
| 2010/0287592 A1 | 11/2010 | Patten et al. | |
| 2010/0299176 A1* | 11/2010 | Mangipudi | G06Q 10/06316 705/7.26 |
| 2011/0035274 A1 | 2/2011 | Goel et al. | |
| 2011/0078246 A1 | 3/2011 | Dittmer-Roche | |
| 2011/0099605 A1 | 4/2011 | Cha et al. | |
| 2011/0179483 A1 | 7/2011 | Paterson et al. | |
| 2011/0185287 A1 | 7/2011 | Dharmarajan et al. | |
| 2011/0271201 A1 | 11/2011 | Cavagnari et al. | |
| 2011/0288946 A1 | 11/2011 | Baiya et al. | |
| 2012/0041752 A1 | 2/2012 | Wang et al. | |
| 2012/0109882 A1 | 5/2012 | Bouse et al. | |
| 2012/0204250 A1* | 8/2012 | Anderson | H04L 63/18 726/9 |
| 2012/0259919 A1 | 10/2012 | Yan et al. | |
| 2012/0331402 A1 | 12/2012 | Hon et al. | |
| 2013/0024268 A1 | 1/2013 | Manickavelu | |
| 2013/0117376 A1 | 5/2013 | Filman et al. | |
| 2013/0132833 A1 | 5/2013 | White et al. | |
| 2013/0204715 A1 | 8/2013 | Zhang | |
| 2013/0297680 A1 | 11/2013 | Smith et al. | |
| 2013/0298006 A1 | 11/2013 | Good et al. | |
| 2013/0311943 A1 | 11/2013 | Barcelo | |
| 2014/0006951 A1 | 1/2014 | Hunter | |
| 2014/0089775 A1 | 3/2014 | Worsley et al. | |
| 2014/0101136 A1 | 4/2014 | Mizuno et al. | |
| 2014/0172799 A1 | 6/2014 | Dorman | |
| 2014/0186010 A1 | 7/2014 | Guckenberger et al. | |
| 2014/0195616 A1 | 7/2014 | Sun | |
| 2014/0230076 A1* | 8/2014 | Micucci | G06F 21/6209 726/28 |
| 2014/0245134 A1 | 8/2014 | Portnoy et al. | |
| 2014/0325354 A1 | 10/2014 | Zhang et al. | |
| 2014/0337250 A1* | 11/2014 | Matsuyama | G06Q 30/02 705/347 |
| 2015/0012616 A1 | 1/2015 | Pearl et al. | |
| 2015/0026212 A1 | 1/2015 | Fink et al. | |
| 2015/0066665 A1 | 3/2015 | Long et al. | |
| 2015/0082197 A1 | 3/2015 | Pearl et al. | |
| 2015/0195311 A1 | 7/2015 | Lemonik et al. | |
| 2015/0199307 A1 | 7/2015 | Zhang et al. | |
| 2015/0199318 A1 | 7/2015 | Lemonik et al. | |
| 2015/0220352 A1 | 8/2015 | Wilson | |
| 2015/0227290 A1 | 8/2015 | Lewis et al. | |
| 2015/0234542 A1 | 8/2015 | Kirillov | |
| 2015/0278513 A1 | 10/2015 | Krasin et al. | |
| 2015/0302338 A1 | 10/2015 | Zaveri | |
| 2015/0326651 A1 | 11/2015 | Ormseth et al. | |
| 2016/0070812 A1 | 3/2016 | Murphy et al. | |
| 2016/0085570 A9 | 3/2016 | Obata et al. | |
| 2016/0103801 A1* | 4/2016 | Bortz | G06F 40/134 715/205 |
| 2016/0110123 A1 | 4/2016 | Vega-Gonzalez | |
| 2016/0134596 A1 | 5/2016 | Kovacs et al. | |
| 2016/0162148 A1 | 6/2016 | Murphy et al. | |
| 2016/0291856 A1 | 10/2016 | Von Muhlen et al. | |
| 2016/0294954 A1 | 10/2016 | Khayrudinov et al. | |
| 2016/0345066 A1* | 11/2016 | Barker | H04N 21/23439 |
| 2016/0373387 A1 | 12/2016 | Reyes | |
| 2017/0039476 A1 | 2/2017 | Eyring et al. | |
| 2017/0063924 A1 | 3/2017 | Dick et al. | |
| 2017/0090734 A1 | 3/2017 | Fitzpatrick | |
| 2017/0109391 A1 | 4/2017 | Rosen et al. | |
| 2017/0161253 A1* | 6/2017 | Silver | H04L 67/2804 |
| 2017/0168692 A1 | 6/2017 | Chandra et al. | |
| 2017/0168856 A1 | 6/2017 | Bhargava | |
| 2017/0192856 A1 | 7/2017 | Chin et al. | |
| 2017/0201551 A1 | 7/2017 | Tripepi | |
| 2017/0201587 A1 | 7/2017 | Appleyard et al. | |
| 2017/0353458 A1 | 12/2017 | Lipke et al. | |
| 2018/0107746 A1* | 4/2018 | Jackson | G06F 16/955 |
| 2018/0176207 A1 | 6/2018 | Malatesha et al. | |
| 2018/0181552 A1 | 6/2018 | Konnola et al. | |
| 2018/0181723 A1 | 6/2018 | Von Muhlen et al. | |
| 2019/0065591 A1 | 2/2019 | Sanio et al. | |
| 2019/0068723 A1 | 2/2019 | Drasin | |
| 2020/0128282 A1 | 4/2020 | Brockmann et al. | |
| 2020/0145504 A1* | 5/2020 | Price | G06N 20/00 |

OTHER PUBLICATIONS

Olson et al, Trust Negotiation as an Authorization Service for Web Services, IEEE, Apr. 7, 2006, pp. 1-10.*

Non-Final Office Action from U.S. Appl. No. 15/789,818, dated Nov. 27, 2019, 27 pages.

Constantin Taivan, "Web-Based Applications for Open Display Networks," Diss. Universidade do Minho (Portugal), 2014.

Final Office Action from U.S. Appl. No. 15/789,809, dated Sep. 19, 2019, 23 pages.

Final Office Action from U.S. Appl. No. 15/789,818, dated Jun. 8, 2020, 27 pages.

Machado R., et al., "Adessowiki—Collaborative Platform for Writing Executable Papers," Procedia Computer Science, 2011, 9 pages.

Non-Final Office Action from U.S. Appl. No. 15/789,809, dated Apr. 15, 2020, 24 pages.

Rittner L., et al., "Adessowiki: Collaborative Scientific Programming Environment," 2011, 7 pages.

West M., "Play Safely in Sandboxed I Frames," Jan. 4, 2013, 9 pages.

Zhou Y., et al., "Understanding and Monitoring Embedded Web Scripts," 2015, 16 Pages.

Final Office Action from U.S. Appl. No. 15/789,809, dated Sep. 22, 2020, 23 pages.

Notice of Allowance from U.S. Appl. No. 15/789,818, dated Sep. 30, 2020, 18 pages.

Schmid O., et al., "Real-time Collaboration through Web Applications: An Introduction to the Toolkit for Web-based InteractiveCollaborative Environments (TWICE)", Personal and Ubiquitous Computing, Jun. 2014, pp. 1201-1211.

* cited by examiner

AUTHENTICATION SECURITY MODEL FOR A CONTENT MANAGEMENT SYSTEM

BACKGROUND

Content management services allow users to access and manage content items across multiple devices using a network. Some content management services may allow users to share content items with other users in order to aid collaboration. In a typical content management service, a user establishes a content management account with the service provider and can associate various content items with the content management account. For example, content management services may allow the user to store content items (including but not limited to text documents; email messages; text messages; other types of messages; media files such as photos, videos, and audio files; and/or folders containing multiple files). Some content items may also be configured to include and/or display various items of embedded content as well.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
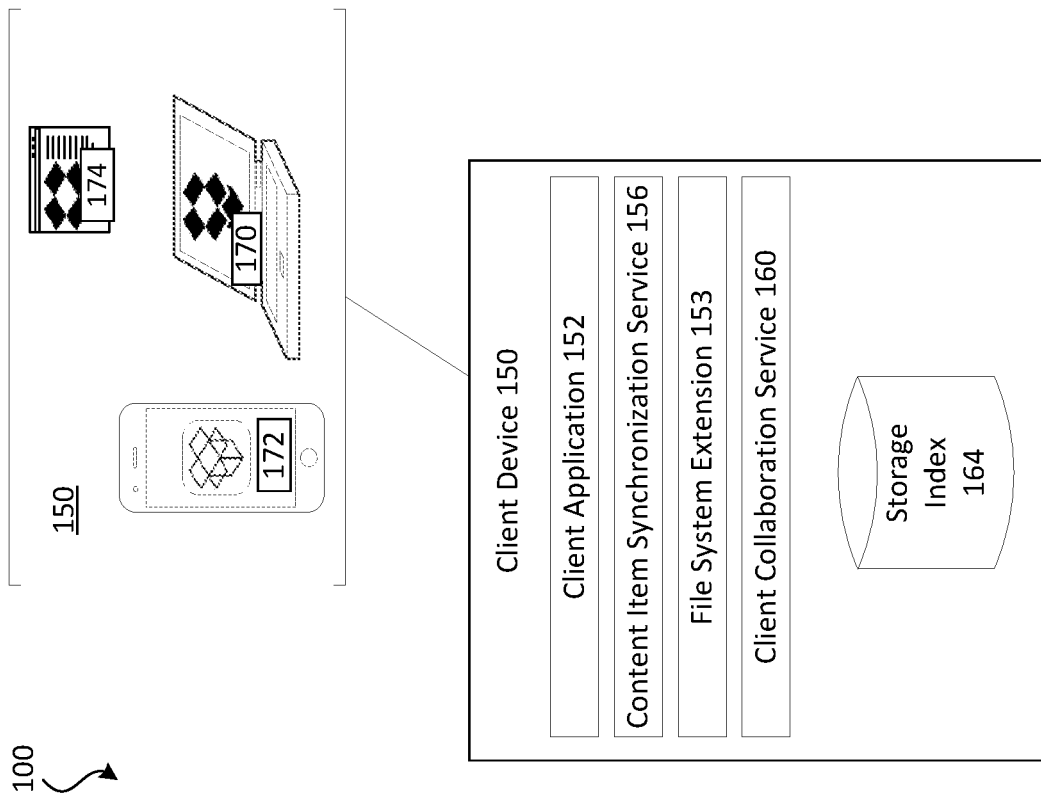
FIG. 1A shows an example of a content management system and client devices, in accordance with some embodiments.
Figure 1A:
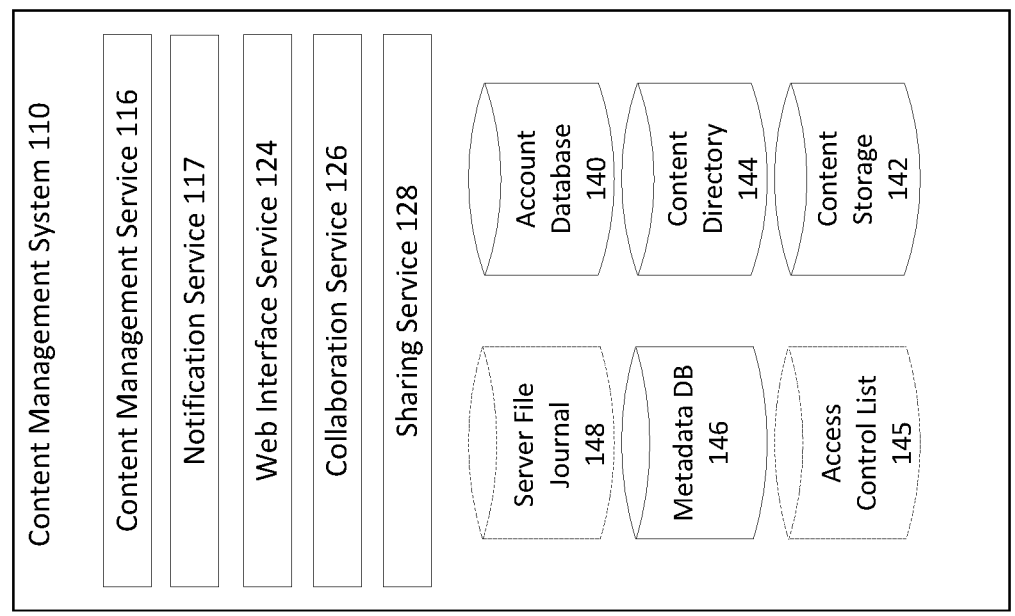

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for enabling external parties to provide functionality on a content management platform. Although content management platforms provide a number of features and capabilities, the list of features and capabilities may be limited for various reasons. For example, having and providing the resources needed to implement and maintain every conceivable feature may be quite burdensome and impractical. In other cases, external parties may have special insight into features that may be useful for the content management platform, may wish to implement features that the administrators of the content management platform deem to be of secondary importance, or may wish to customize certain features to their liking.

In still other cases, some functionalities may involve interfacing with another platform external to the content management platform and the external parties may have specialized technical knowledge of how the content management platform needs to interface with the external platform in order to achieve the desired result and/or interoperability between the content management platform and the external platform, when and what changes to the external platform occur, and how to update the functionality in order to maintain interoperability between the content management platform and the external platform. For example, the external platform may be a content platform configured to generate content that may be embedded into a content item stored on the content management platform. The content may be hosted on the content platform and may be difficult to embed based on the complex nature of the content and/or the complex nature of the content platform. The content may include, for example, videos, web pages, insights, structured content, widgets, or any other content that is hosted or interfaces with the content platform.

Aspects of the subject technology enable external parties to provide functionalities on a content management platform by allowing the external parties to create applications or write code for the content management platform. For example, external parties may create applications that run on the content management platform that help to embed certain content (e.g., content created or hosted by an external content platform) into a file or document hosted by or accessed via the content management platform.

However, because various computing devices distributed across a network (e.g., the internet) are associated with various parties (e.g., the content platform, the content management platform, users, etc.), interact with one another, and execute code, there are various technical obstacles rooted in computer and network technology. For example, for security reasons, it is important to restrict access of external parties and the code or applications provided by the external parties so that they cannot access or make alterations to data that they are not authorized to access or alter. Furthermore, some external parties may lack the technical infrastructure to fully support their applications or code created for the content management platform. Aspects of the subject technology provide a technical framework and computing infrastructure to address these and other technical problems.

In some embodiments, the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, and delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, or move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as a folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 1B:
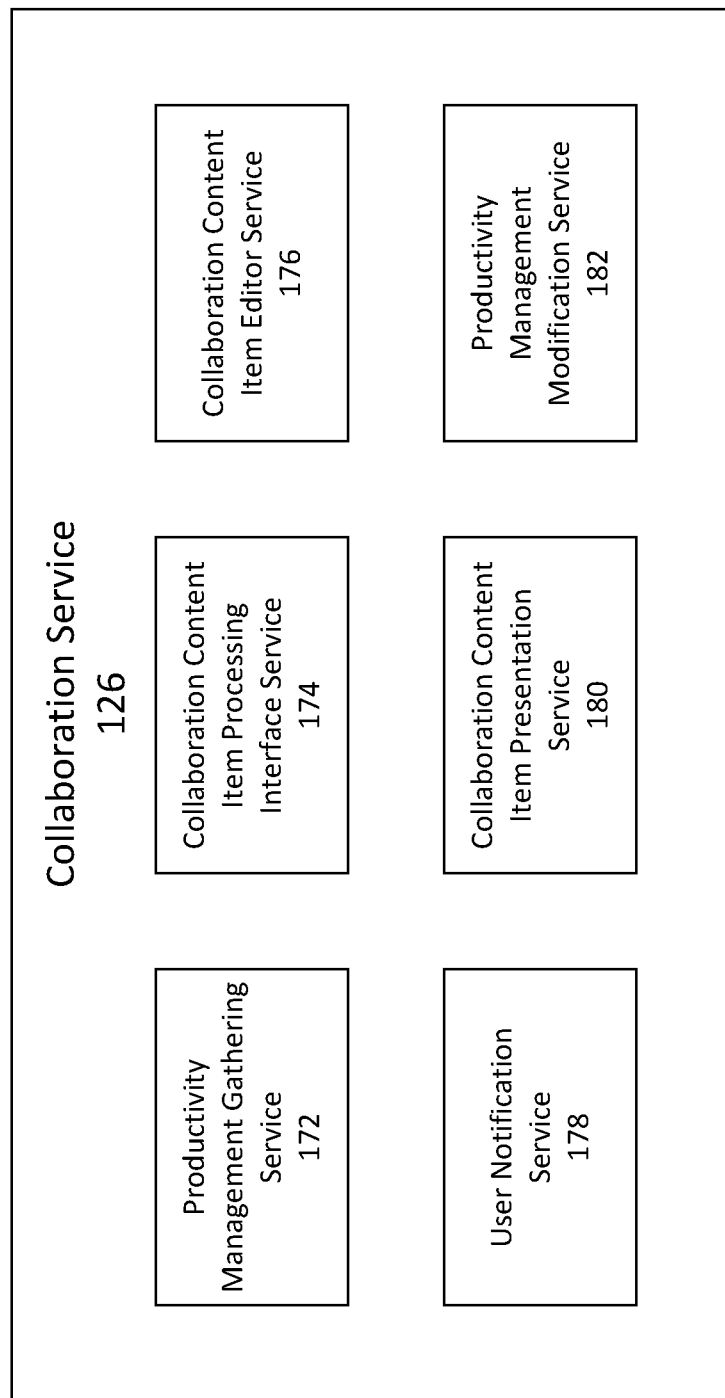
FIG. 1B shows an example collaboration service, in accordance with some embodiments.

FIG. 1B shows an example collaboration service 126, according to some embodiments. Collaboration service 126 may include productivity management gathering service 172, collaboration content item processing interface service 174, collaboration content item editor service 176, user notification service 178, collaboration content item presentation service 180, and productivity management modification service 182. One or more of productivity management gathering service 172, collaboration content item processing interface service 174, collaboration content item editor service 176, user notification service 178, collaboration content item presentation service 180, and productivity management modification service 182 may be coupled to one another or to services not explicitly shown.

Productivity management gathering service 172 may be configured to gather productivity data from productivity management system 140. In various embodiments, productivity management gathering service 172 identifies an event and gathers information related to the event. For instance, productivity management gathering service 172 may gather a specific calendar entry and/or a specific task from an online calendar. Productivity management gathering service 172 may further gather information from the calendar entry or gather information related to the calendar entry such as time(s), date(s), relevant locations, title(s), agenda(s), summaries, description(s), and/or attendees related to the event. Productivity management gathering module 172 may provide the productivity data to the other services of collaboration service 126.

Collaboration content item processing interface service 174 may be configured to interface with collaboration service 126. In various embodiments, collaboration content item processing interface service 174 may provide collaboration content items to one or more services of collaboration service 126, as described further herein.

Collaboration content item editor service 176 may be configured to create and/or modify collaboration content items. A collaboration content item may be created in a variety of ways. In some embodiments, collaboration content item editor service 176 enables creation of the collaboration content item into the content management system 106. Collaboration content item editor service 176 may enable access to or be any collaboration content item editing application (e.g., Microsoft Word®, Google Docs®, or the like) either in the cloud or executed locally. In one example, content management system 106 may provide to one of client devices 102 a user interface element (e.g., a box or a button) that allows creation of a new collaboration content item.

In some embodiments, collaboration content item editor service 176 may create the collaboration content item in conjunction with the productivity management system 140. For example, collaboration content item editor service 176 may provide a suggestion to a user to create or invoke a collaboration content item associated with an upcoming event. In various embodiments, collaboration service 126 may identify a user that is opening or otherwise using collaboration content item editor service 176. Productivity management gathering service 172 may identify an upcoming event for the user on the user's calendar. Subsequently, collaboration content item editor service 176 may provide a suggestion to the user to create or invoke the collaboration content item associated with the upcoming event.

Although it is discussed that collaboration content item editor service 176 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor service 176 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor service 176 may configure the productivity management system 140 to provide access to the collaboration content item (e.g., using a link, including the collaboration content item, or any other mechanism to enable access to the collaboration content item) in a meeting request, a task entry, or the like. In some embodiments, collaboration content item editor service 176 may instruct productivity management system 140 to place an icon corresponding to a link to the collaboration content item in the calendar entry, meeting request, task entry, or the like.

When a user has opened the link (e.g., by clicking the icon), the user may be directly guided to the collaboration content item from the meeting request, task entry, or the like. In one example, the link in the calendar entry may provide the user (e.g., using client device 102) access to a collaboration content item stored in content management system 106 (e.g., in storage accessible through the cloud) or in productivity management system 140.

Once the user requests to create or invoke the collaboration content item, collaboration content item editor service 176 may create and/or invoke a collaboration content item. The collaboration content item may be subsequently edited, altered, viewed, changed, stored, and/or the like by an editing application (e.g., either stored locally on a client device 102 or in the cloud). In various embodiments, one or more different client devices 102 may utilize different editing applications to make changes to the collaboration content item. Collaboration content item editor service 176 and/or other editing applications may allow for the collaboration content item to be changed by multiple different users using different client devices 102 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor service 176 may receive from users additional content for the collaboration content item. For example, collaboration content item editor service 176 may be configured to receive from the client devices 102 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor service 176 may obtain edits (e.g., text changes and/or additions of audio files, pictures, tables, or the like) from any number of client devices 102 at a given time (or in real time). Collaboration edits may be incorporated in a variety of formats, including formats that provide different text attributes such as colors, fonts, styles, or the like for different users.

In various embodiments, collaboration content item editor service 176 (and or a security or permissions service associated with a server) may establish permissions and/or security for the collaboration content item. For example, collaboration content item editor service 176 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways. For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ]@kingHenry" can be interpreted such that @kingHenry links to a user with the username "kingHenry," and this link is used by the primitive "[ ]" to creates a new task, where that task is assigned to the kingHenry user.

In various embodiments, collaborative content item editor service 176 (and or a security or permissions service associated with a server) may establish permissions and/or security for the collaborative content item. For example, collaborative content item editor service 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 178 may be configured to notify users of each of the client devices 102 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 178 provides notifications about changes to the client devices 102. For example, user notification service 178 may notify users whether a collaboration content item has been created for an event. As another example, user notification service 178 may notify specific users that they have been invited to attend an event.

Collaboration content item presentation service 180 may provide to the client devices 102 selected collaboration content items. The collaboration content items may be displayed in the client devices 102 through a native application, an Internet browsing window, or the like supported by the client devices 102.

It will be appreciated that collaboration content item presentation service 180 may restrict writing permissions to the collaboration content items at any time. In an example, prior to occurrence of the event, collaboration content item presentation service 180 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 180 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 182 may be configured to coordinate collaboration content items with calendar entries and to enable access to the collaboration content item through calendar entries.

Figure 2:
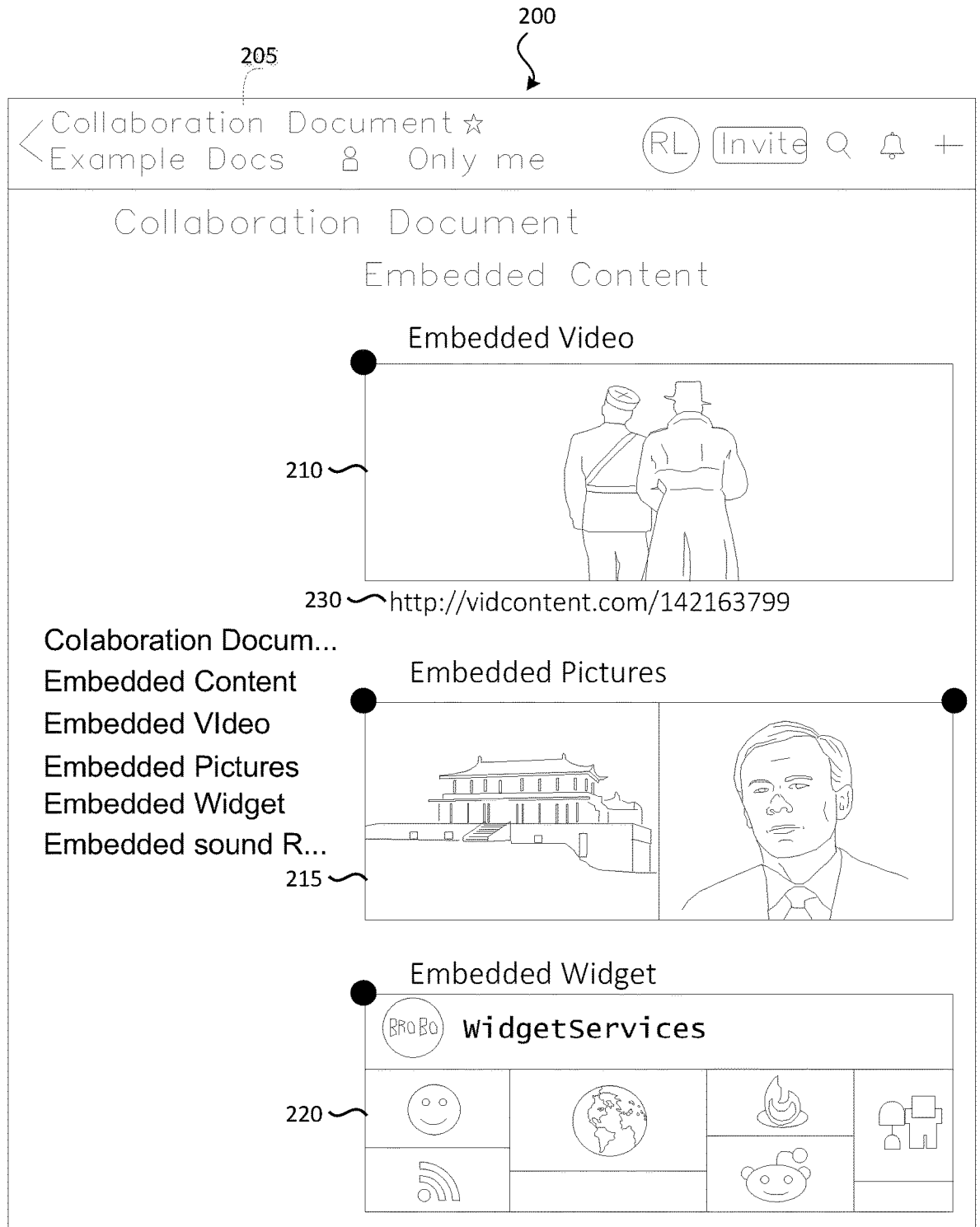
FIG. 2 shows an example graphical user interface displaying a content item managed by a content management system, in accordance with various embodiments of the subject technology.

FIG. 2 shows an example graphical user interface 200 displaying a content item managed by a content management system, in accordance with various embodiments of the subject technology. The graphical user interface 200 may be provided by a client application (e.g., a web browser or native application) running on a client device. The client application may be configured to interface with the content management system to retrieve and display a content item stored or managed by the content management system. In FIG. 2, the content item is in the form of collaboration document 205. However, other types of content items (e.g., other types of files) may also be presented to the user.

The content management system may enable other content items to be embedded in the collaboration document 205. For example, a user may use the graphical user interface 200 to embed another content item (e.g., a picture, a video, a document, an audio file, or file) stored on the local client device into the collaboration document 205. The user may also use the graphical user interface 200 to embed content items stored elsewhere such as on the content management system or some other content providing service (e.g., a content platform). In FIG. 2, the collaboration document includes an embedded video 210, embedded pictures 215, and an embedded widget 220. As seen in FIG. 210, the embedded video 210 is a content item stored at a remote content provider that is accessible via an internet URL 230. The other embedded content items may be similarly accessed via a remote content provider or locally at the client device.

The client application working with the content management system may execute code that facilitates the embedding of content items. For example, a user may embed embedded video 210 in FIG. 2 by simply inserting the URL 230 for a video stored on a remote content providing service. This method is far simpler and more convenient from the user's perspective than conventional methods. In response to receiving the URL 230 in the collaboration document 205, code executed by the client application and/or the content management system may determine, based on the URL 230, the kind of content that the user wishes to embed in the collaboration document 205, locate the resources available accessible via the the URL 230, identify which content item the user wishes to embed (in some cases the URL 230 may refer to a webpage that includes several candidate content items), retrieve the desired content item, and embed the content into the collaboration document 205.

The code required to embed the content item in a visually pleasing and consistent manner and is complex and can be implemented in many ways. The content management system may allow an external party (e.g., the remote content provider) to provide code used to embed content for URLs with domains associated with the external party. In many cases, the external party may be in the best position to know how to interface with their web or content servers and may have preferences for how their content should be displayed and/or embedded within the collaborative document 205.

Aspects of the subject technology further provide a framework that prevents external code (e.g., third-party code) from accessing or making alterations to other portions of a content item, content items managed by the content management system for the user, preferences, profiles, functionality, or other data associated with a user account on the content management system.

According to some embodiments, a portion of a content item is provided to run external code and/or display external content. For example, the graphical user interface 200 of FIG. 2 displays a content item in the form of a collaboration document 205. The code for the collaboration document 205 is retrieved from a domain associated with the content management system and executed on a client device for display to a user.

Embedded content generated based on code from an external source may be provided in a portion of the collaboration document 205 configured to host the external code. The portion of the collaboration document 205 may be in the form of an inline frame ("iframe"), which is a web document embedded within another web document. The iframe is configured to restrict access to the code or content contained within the iframe while at the same time enabling secure communication between the iframe portion and the enclosing content item (e.g., the collaboration document 205).

For example, each of the embedded video 210, the embedded pictures 215, or the embedded widget 220 may be provided by external code and/or display content retrieved from an external source (e.g., a third-party server). If the content is provided by external code or displays external content, the content may be embedded in an iframe in the collaboration document 205. In some cases, content (e.g., audio content or code that performs a function) may not be displayed or displayable. However, the content may still be embedded in a code portion in the code of the collaboration document 205 such as in a hidden iframe. Although the portion implemented by an iframe is specific to certain implementations that incorporate Hypertext Markup Language (HTML) and/or JavaScript code, other types of restrictions may also be used. For example, postMessages may be used to communicate (pass information, request information, etc.) between the collaboration document 205 and the iframe.

For additional security, external code may be stored on a separate domain of the content management system (e.g., a sandboxed domain) from the domain where the content item and code configured to render the content item are stored.

Figure 3:
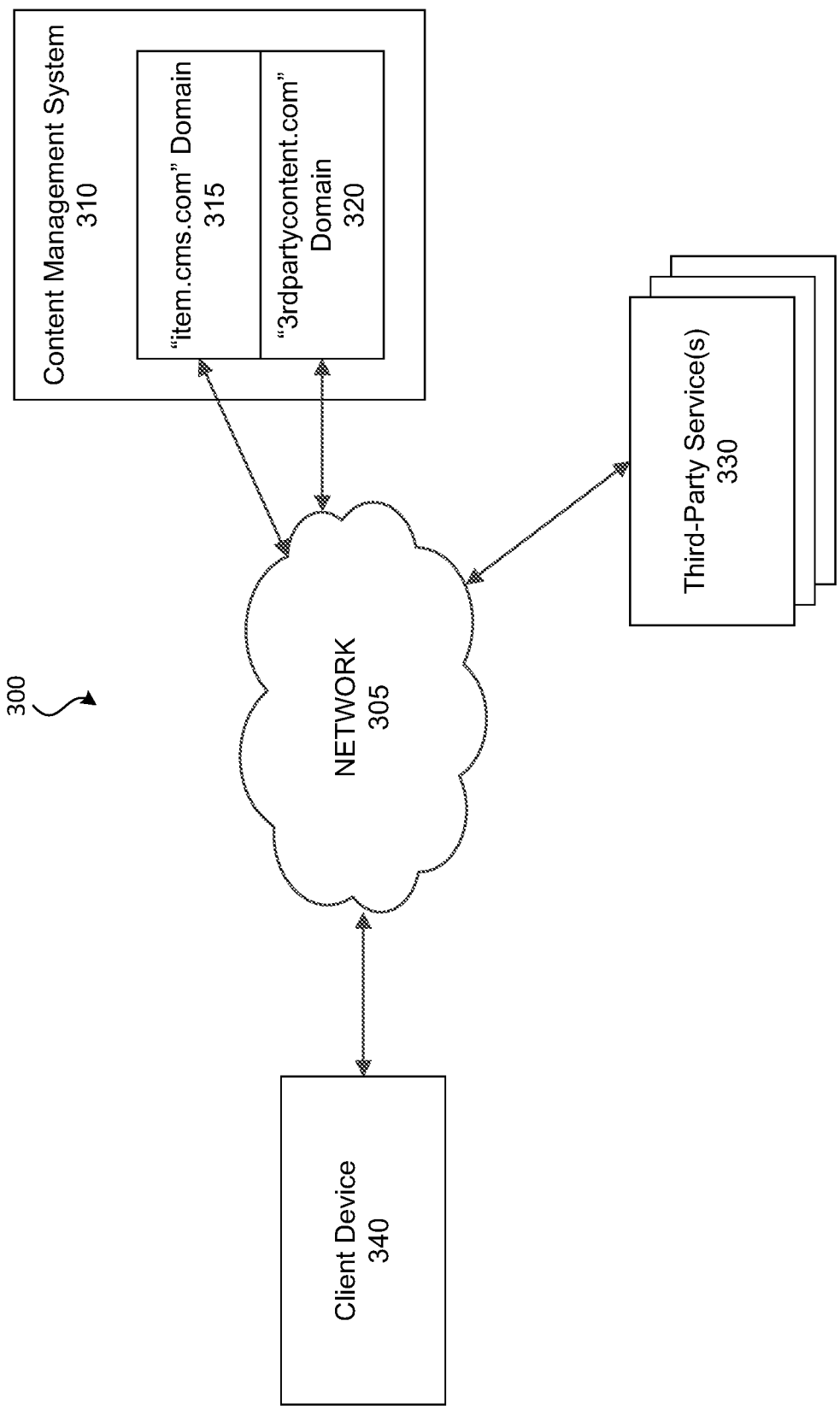
FIG. 3 shows an example network environment that includes a content management system with separate domains, in accordance with various embodiments of the subject technology.

FIG. 3 illustrates an example network environment 300 that includes a content management system 310 with separate domains, in accordance with various embodiments of the subject technology. The content management system 310 includes at least two domains (e.g., a web domain registered with a domain name system) accessible to a client device 340 and/or third-party services 330 via a network 305 such as the internet. In FIG. 3, the domains include an "item.cms.com" domain 315 and a "3rdpartycontent.com" domain 320.

The "3rdpartycontent.com" domain 320 may be configured to store external code from a third-party (e.g., third-party services 330). For example, one or more third-party services 330 may submit code to the content management system 310 to store on the "3rdpartycontent.com" domain 320. The code may include content to be included within a portion of an associated content item and/or code designed to retrieve or generate content to be included within a portion of the associated content item. For example, content or additional code may be retrieved from the third-party service 330 or a different third-party service and/or be generated based on information provided by the content item and/or the "item.cms.com" domain 315.

The "item.cms.com" domain 315 may be configured to provide a user with access to content items associated with the user account. For example, a client device 340 may include a client application (e.g., a native application or web browser) associated with the user account that communicate with the "item.cms.com" domain 315 to retrieve a content item. The content item may include one or more portions (e.g., iframes) that is reserved for and references external code. When the client application renders the one or more portions reserved for external code, the client application may request and retrieve the code from the "3rdpartycontent.com" domain 320 provided by the content management system 310 and execute the code from the "3rdpartycontent.com" domain 320.

According to some embodiments, a "same-origin" policy is maintained where application code from one domain (e.g., the "3rdpartycontent.com" domain 320) cannot access or alter data or code associated with a different domain (e.g., the "item.cms.com" domain 315) except through a secure interface or protocol (e.g., a postMessage interface). Accordingly, because the content item and the external code are scoped to different domains, they are isolated from each other when executed by the client application running on the client device 340. Data from the external code and the content item may be passed to each one another via a secure communication interface (e.g., postMessage functionality).

Figure 4:
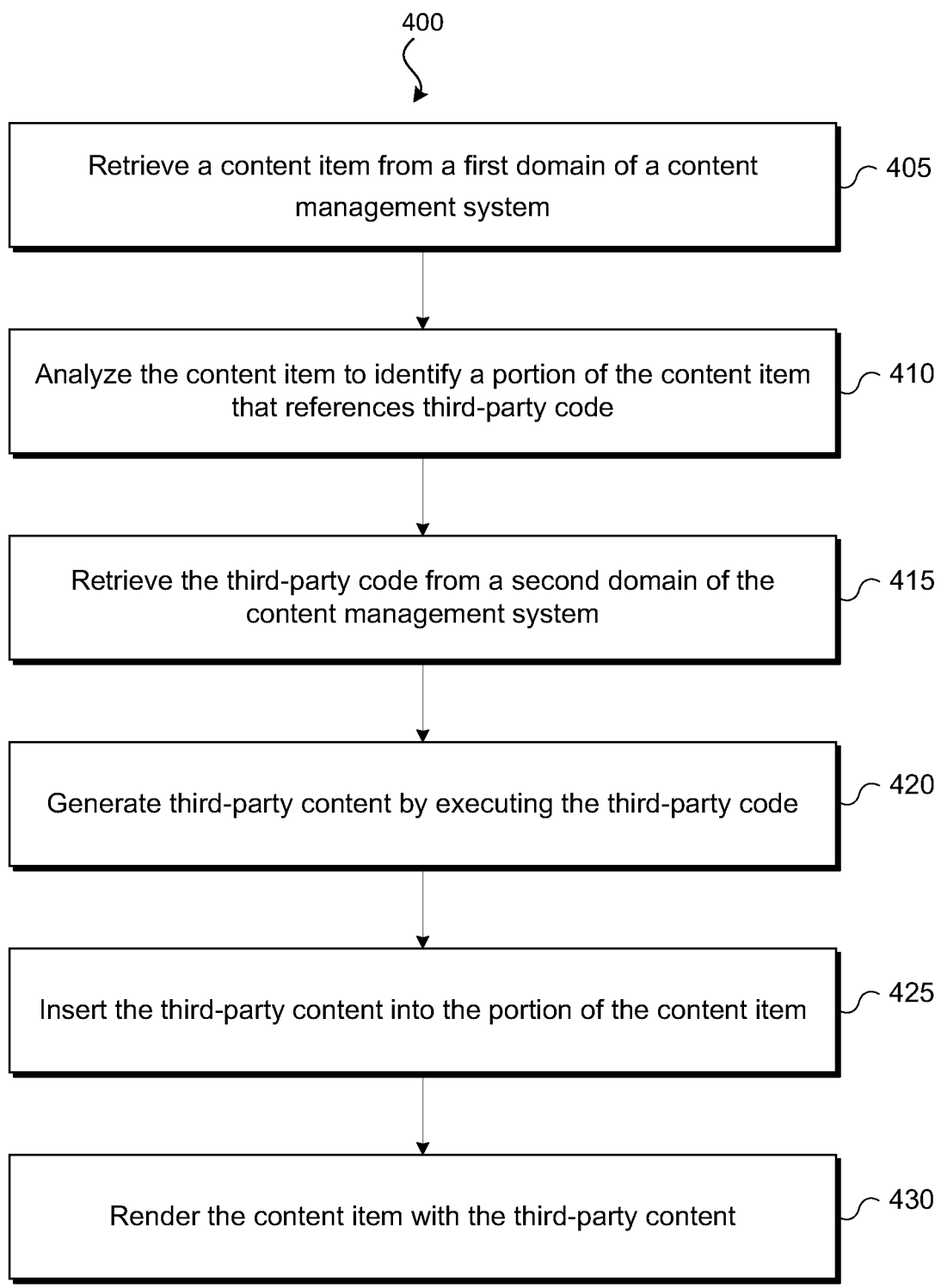
FIG. 4 shows an example method for rendering a content item that includes third-party content, in accordance with various embodiments of the subject technology.

FIG. 4 shows an example method 400 for rendering a content item that includes third-party content, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 400 may be implemented by computing device such as, for example, a client device.

At operation 405, a client application running on a client device may request and retrieve a content item from a first domain of a content management system. The content item may be, for example, a collaboration document associated with a user account. The client application may display the content item on the client device by reading the data and code in the content item. At operation 410, the client application analyzes the content item and identifies a portion of the content item that references third-party code. For example, the portion of the content item may be an iframe that references third-party code.

Based on the portion of the content item that references the third-party code, at operation 415, the client application requests and retrieves the third-party code from a second domain of the content management system. The third-party code may have been previously provided to the content management system by a third domain associated with a source external to the content management system and stored by the content management system in the second domain.

At operation 420, the client application generates third-party content by executing the retrieved third-party code. The third-party content may be static content (e.g., text, images, audio or other media, files, or other content that is constant) or dynamic content. Dynamic content may include content retrieved from a third-party source (e.g., an external server), dependent on data from a third-party source, and/or dependent on data from the content item or the content management system. Certain applications, functionality, or content generated from applications are examples of dynamic content.

At operation 425, the client application inserts the third-party content into the portion of the content item that references the third-party code and, at operation 430, renders the content item with the third-party content. In some cases, the third-party content is not configured to be displayed in the content item. For example, the third-party content may include third-party code to be executed in a hidden iframe. Accordingly, rendering the third-party content may involve executing the third-party code in a hidden iframe.

Authentication Security Model

As described above, in some scenarios, content generated by the external third-party code (e.g., an application, a script, digital content, and/or other code configured to be executed by a computing device) may be retrieved from or based on data retrieved from an external source (e.g., a third-party service or some other source). If the external source is public, no authentication may be needed. However, if the external source is associated with a user account, the user account may need to be authenticated.

According to some embodiments of the subject technology, a user of the content management system may link a content item managed by the content management system with an external user account. For example, a user may access a content item and wish to embed content from a third-party service that is associated with another account for that third-party service. The third-party service may provide an application programming interface (API) that allows for the content item to retrieve content from the third-party service. The content may be dynamic and updated by the third-party service or change over time based on the third-party service, the content item, or a number of other factors. Because the content from the third-party service is associated with a particular account (and not accessible to the public), an authentication process is used in various embodiments.

According to some embodiments, a 3-legged OAuth registration process may be used to obtain credentials (e.g., a security token) for the external third-party user account. For example, a user on a client device running a client application may access a user interface provided by the content management system and click a button or perform some other triggering action to link the user's content management system account with an external third-party account. In an alternative embodiment, the user may link a content item (e.g., a collaboration document) managed by the content management system with the external third-party account.

The content management system may redirect the client application to an authentication service that, for example, prompts the user for a user name and password or otherwise authenticates the user. The authentication service may be a part of the third-party service or serve as an independent identity provider/authenticator. Once the user is authenticated by the authentication service, the authentication service may provide credentials for the external third-party account to the client application. The client application may forward the credentials for the third-party account to the content management system where the credentials may be linked with the content item of the user's account and stored by the content management system for future use.

For example, the user may in a current or subsequent session with the content management system embed third-party content into a content item (e.g., a collaboration document). As a part of the embedding process, the content management system may request content or other data associated with a third-party account from a third-party service. In order to access the content or other data associated with the third-party account, the content management system may transmit the stored credentials for the third-party account.

Furthermore, in subsequent sessions with the content management system, the user that authenticated the third-party account or another user that has access to the content item (e.g., the collaboration document) may load the content item that includes the third-party content without needing to authenticate the third-party account with the third-party service because the content management system is configured to transmit the stored credentials to the third-party service when retrieving the third-party content.

Figure 5:
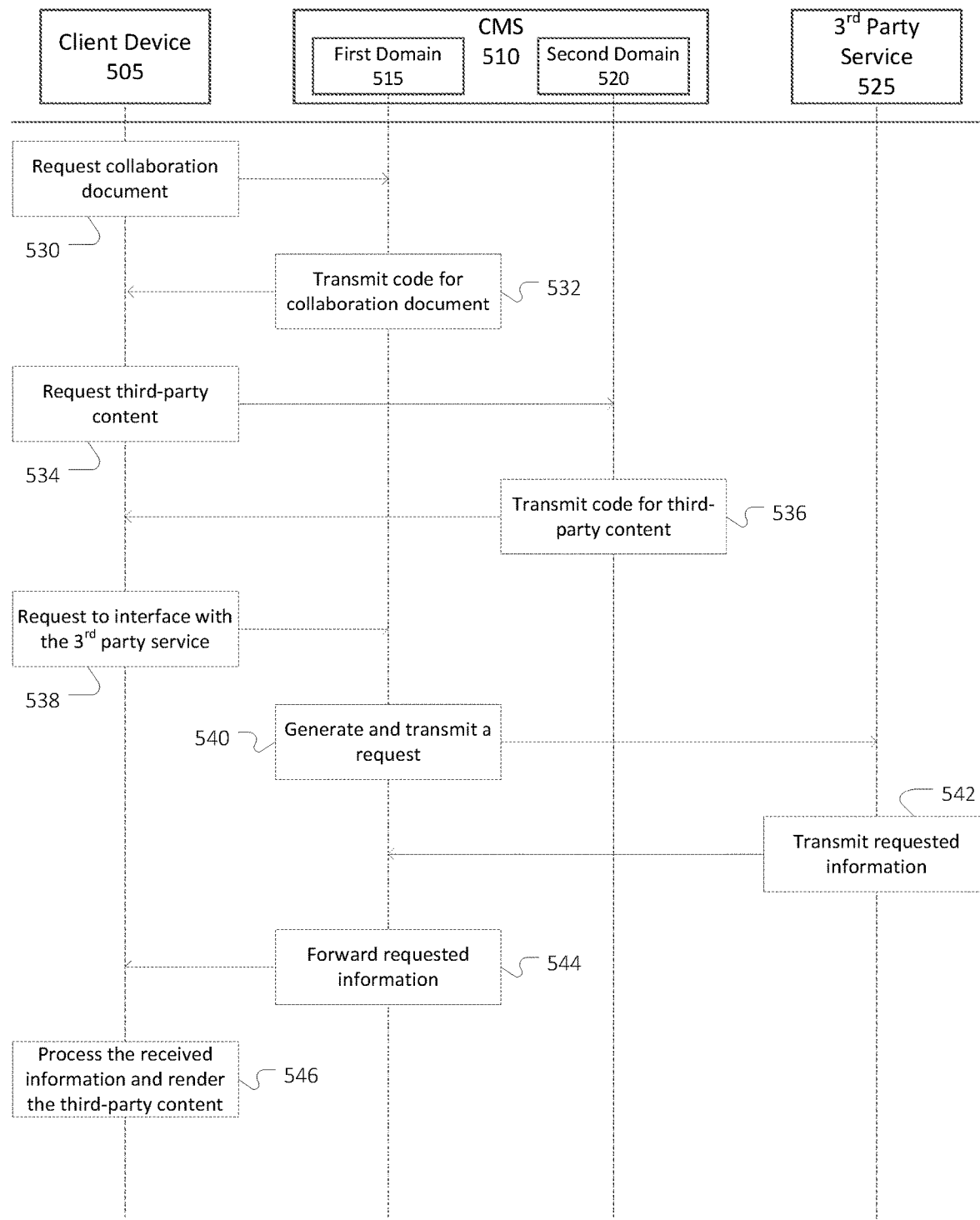
FIG. 5 shows a data flow diagram illustrating a process for retrieving a content item with content associated with a third-party service, in accordance with various embodiments of the subject technology.

FIG. 5 is a data flow diagram illustrating process for retrieving a content item with content associated with a third-party service, in accordance with various embodiments of the subject technology. The data flow diagram includes a client device 505, a content management system (CMS) 510, and a third-party service 525. As described above, the CMS 510 may include a first domain 515 (e.g., the "item.cms-.com" domain) and a second domain 520 (e.g., the "3rdpartycontent.com" domain).

A user, via a client application on a client device 505, may interface with the content management system 510 to open a collaboration document (or other content item). The user may be the one that authenticated a third-party account with the third-party service 525 or another user with permission to view the collaboration document. At 530, the client application may transmit a request (e.g., an HTTP request) for the collaboration document to the first domain 515 of the content management system 510. As noted above, the collaboration document and code used to render the collaboration document is associated with the first domain 515 of the CMS 510.

The CMS 510 receives the request, identifies the collaboration document requested, and transmits the code for the collaboration document to the client application at 532. The client application receives the code for the collaboration document and processes the code in order to load and display the collaboration document for the user. While processing the code, the client application identifies a portion (e.g., an iframe) of the collaboration document that references third-party content.

At 534, the client application requests the referenced third-party content from the content management system 510. As noted above, third-party content is stored by the content management system 510 associated with the second domain 520 that is different and separate from the first domain 515 in order to provide a more secure computing environment. For example, a "same-origin" policy may be maintained where the code associated with the second domain 520 cannot directly access or alter data the rest of the collaboration document when executed by the client application. Instead, the code associated with the second domain 520 may transmit requests or otherwise pass information to the collaboration document via a secure interface (e.g., postMessages).

The content management system 510 may receive the request for third-party content via the second domain 520 and transmit the code for third-party content back to the client application at 536. The third-party content from the second domain 520 may include code or other content that may be embedded directly into the collaboration document or executed by the client application in order to provide some functionality to the collaboration document. Additionally, or alternatively, the third-party content from the second domain 520 may also include code configured to interface with one or more external third-party services in order to retrieve additional code, data, or content. If the third-party content does not include any code configured to interface with an external third-party service, the process may proceed to 546, where the third-party content may be executed and/or rendered within the iframe of the collaboration document.

If the third-party content includes code configured to interface with an external third-party service 525, the client application may transmit a request (e.g., an Ajax request) to interface with the third-party service 525 to the first domain 515 of the content management system 510 at 538. The first domain 515 receives the request, determines whether credentials are needed to fulfill the request, and retrieves the required credentials for the third-party account if necessary. The first domain 515 also identifies the correct parameters needed to interface with the API provided by the third-party service, generates a request to interface with the third-party service that includes the appropriate credentials and any necessary parameters.

At 540, the first domain 515 sends the request to the third-party service 525. The third-party service 525 receives the request, validates the credentials, processes the request, and returns content (e.g., code, content, or other data) to the first domain 515 at 542. At 544, the first domain 515 relays the received information to the client application and, at 546, the client applications processes the requested information along with the third-party code from the second domain 520 in order to render the portion of the collaboration document that references third-party content.

Because the credentials are stored by the content management system 510, and in particular, the first domain 515 of the content management system 515, none of the client devices require local possession of the credentials in order to view and correctly render the collaboration document. This is especially helpful when a user with a third-party account wishes to include external content from the third-party service associated with the account in a shared collaboration document. Other viewers of the collaboration document are able to load and correctly view the collaboration document because the content management system 510 has stored the credentials and aided in the retrieval of the external content from the third-party service. As an added benefit to the account holder, the other viewers do not require credentials to view the external content in the collaboration document.

Figure 6:
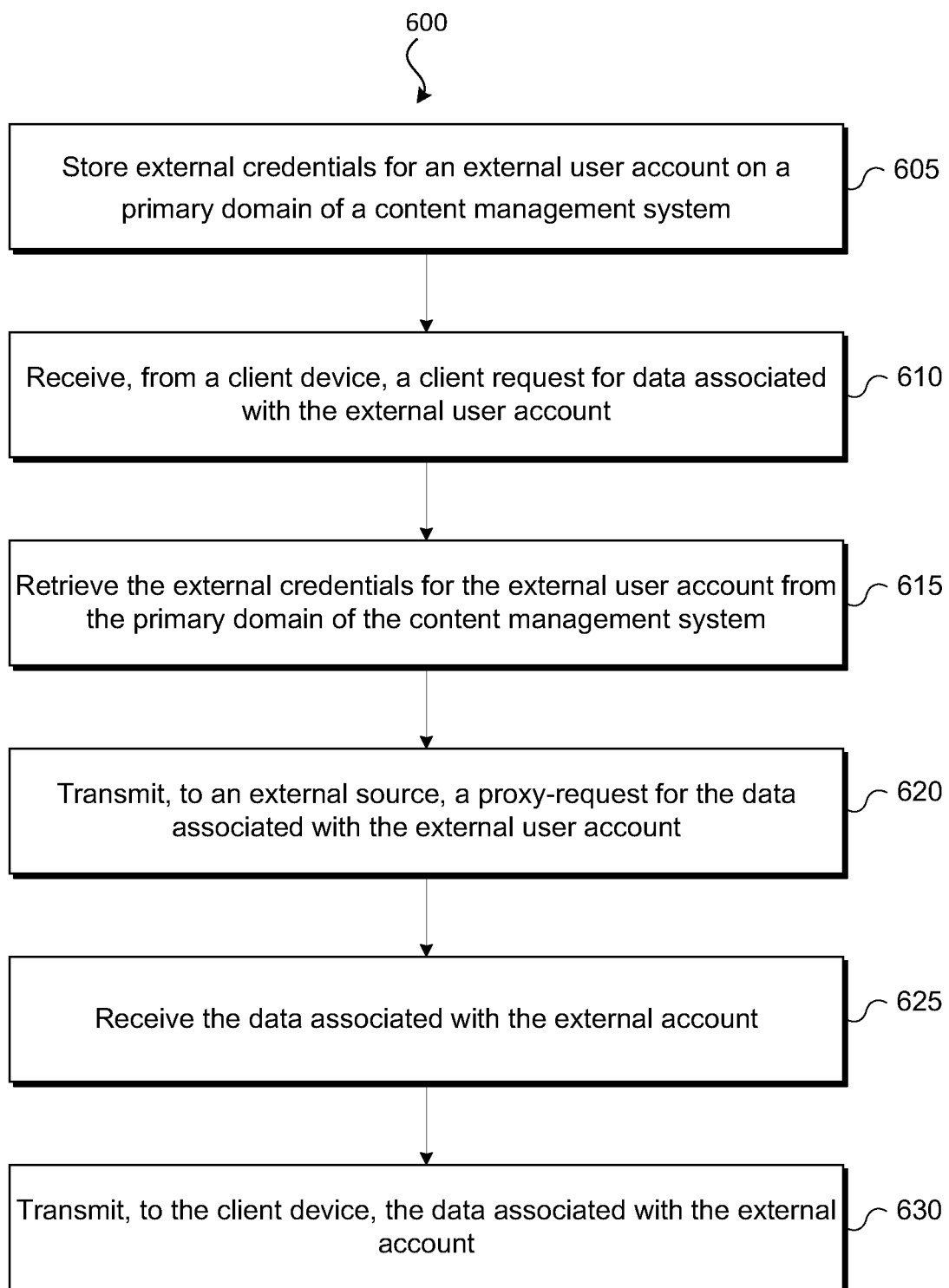
FIG. 6 shows an example method for facilitating the access of content from an external source, in accordance with various embodiments of the subject technology.

FIG. 6 shows an example method 600 for facilitating the access of content from an external source, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by computing device such as, for example, a server, a cluster of servers, or a domain associated with the content management system.

At operation 605, the system may store external credentials for an external user account on a primary domain of a content management system. As described above, the system may participate in an authentication process (e.g., a 3-legged OAuth registration process) to obtain the external credentials. The credentials may be in the form of one or more security or access tokens, username/password combinations, security keys, digital signatures, biometric data, etc. The system may associated the external credentials with a content item (e.g., a collaboration document) stored or managed by the system.

At operation 610, the system receives, from a client device, a client request for data associated with the external user account. For example, the client device may retrieve the content item from the system and identify a portion (e.g., an iframe) of the content item that references data (e.g., third-party data) associated with an external user account. In some scenarios the client request may be received on behalf of a user of the system that is also associated with the external user account. In other words, the external user account may belong to the user or the user may have access to the external user account. In other scenarios, however, the client request may be received on behalf of a user of the system that is not associated with the external account. In other words, the user does not typically have access to the external user account. However, various embodiments of the subject technology allow for the data associated with the external user account to be retrieved for the user and displayed.

In response to receiving the client request, the system retrieves the stored external credentials for the external user account from a primary domain of the content management system at operation 615. At operation 620, the system transmits a proxy-request for the data to an external source such as a third-party service associated with the external user account. The proxy-request may include the external credentials and parameters associated with the client request. The parameters may be from API information for the external source, information from the external source stored on a second domain of the system, provided in the client request, or from another source.

The system receives a response from the external source and, at operation 625, receives the data associated with the external account. At operation 630, the system transmits the data associated with the external account to the client device.

Hosted Storage for Third-Party Services

According to some embodiments, third-party code may not require data from an external third-party service to perform a function in the portion (e.g., the iframe) of the content item (e.g., the collaboration document) managed by the content management system. The function performed by the third-party code (e.g., a third-party application) may include running an application, display content, or some other action. In some implementations, these lightweight third-party applications may store application data on a browser at a client device. However, any application data stored on the browser of the client device may only be visible or accessible to that client device. For collaboration documents or any other shared content, this result is sub-optimal and, in some cases, may be severely limiting.

In one example scenario, third-party code may enable a polling application to be embedded into a collaboration document. The polling application may present a prompt in a portion (e.g., an iframe) of the collaboration document and allow multiple viewers or other users with access to the collaboration document to submit votes for the prompt. The results of the voting along with any number of metrics associated with the poll may be displayed in the portion of the collaboration document as votes are received.

However, in order to enable the polling functionality, the votes from various geographically dispersed users need to be collected and accessible to other users and, as a result, storing application data in at a client device may not be practical. Additionally, some third-party services providing the third-party code may not have or wish to have the backend resources to support storage needed for the third-party code because these computing resources are expensive and complex.

Aspects of the subject technology relate to a content management system providing persistent storage for external third-party code. According to some embodiments, when a user on a client device interacts with a third-party code embedded in a portion of a content item, the third-party code may request additional application data associated with the third-party code from persistent storage provided by the content management system. The content management system may retrieve this data and transmit it to the client device for the third-party code to operate on.

Additionally, or alternatively, additional application data may be generated by the third-party code embedded in the portion of the content item. This additional data may be annotated with tags or identifiers and transmitted to the content management system for storage in persistent storage for external third-party code. The content management system may store the additional data along with the tags/identifiers and a reference to the content item that at generated the additional data.

When the content item is subsequently loaded by the client device or by any other client device authorized to load the content item, the client device may execute the code in the content item, identify a portion of the content item that references third-party code, retrieve the third-party code from a secondary domain of the content management system, and execute the third-party code in the portion of the content item. The third-party code may reference additional application data stored by the content management system for the third-party service. Accordingly, the client device may request the additional application data from the content management system and be provided with the requested data.

Aspects of the subject technology further relate to providing instantaneous updates of this additional application data to other open instances of the content item. For example, when a first user account provides, via a first client device, additional data to the content management system, the content management system may store the additional data and push a notification to other open instances of the content item running on other client devices that additional data has been received. The notification may include the additional data that the other client devices may use to update the portion of the content item running the third-party code. Alternatively, the other client applications associated with the open instances of the content item may be configured to retrieve the additional data in response to receiving the notification.

Figure 7:
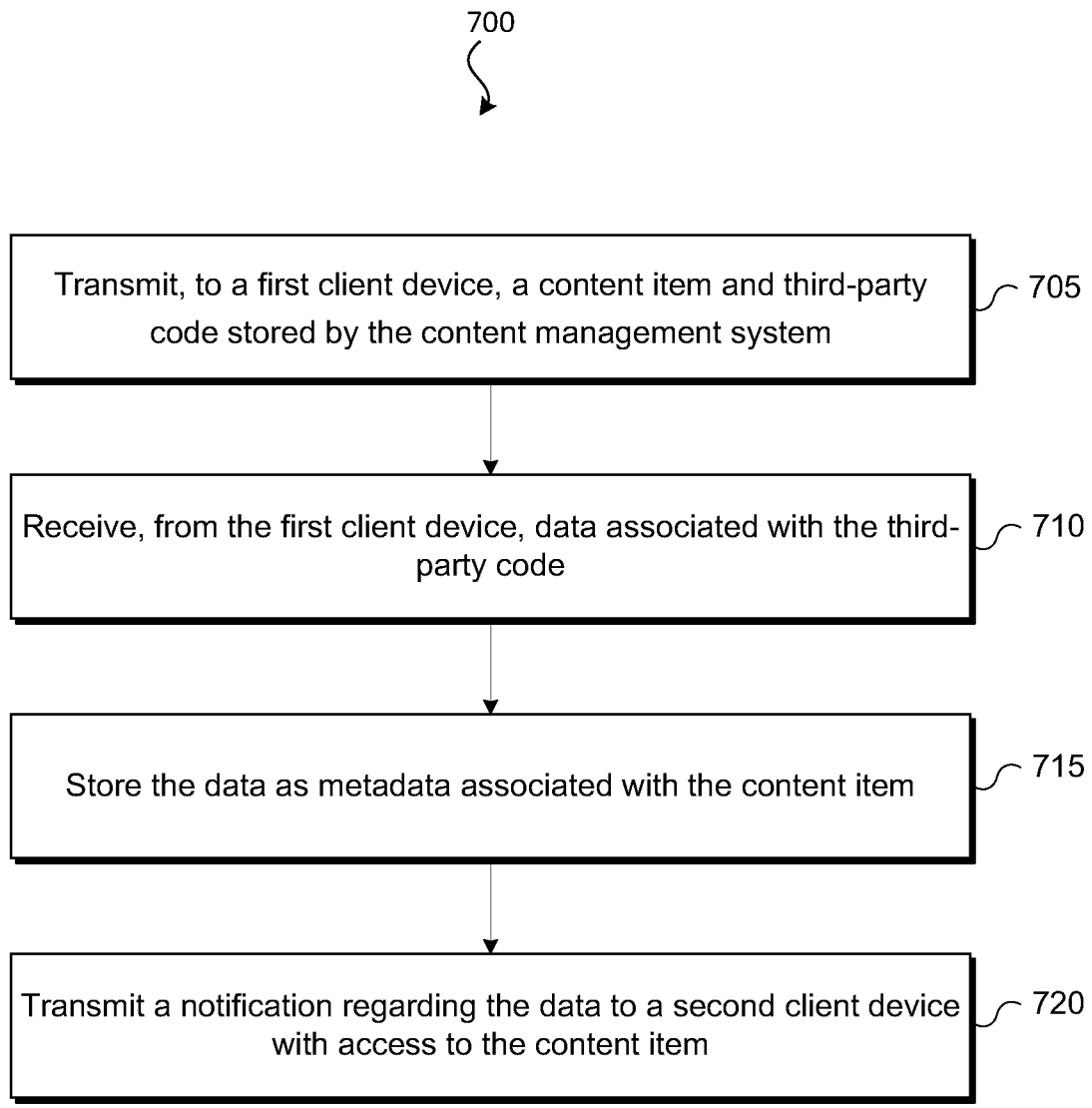
FIG. 7 shows an example method 700 for providing updates of application data to other client devices, in accordance with various embodiments of the subject technology.

FIG. 7 shows an example method 700 for providing updates of application data to other client devices, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 700 may be implemented by computing device such as, for example, a server, a cluster of servers, or a domain associated with the content management system.

At operation 705 the content management system may transmit a content item and third-party code stored on by the content management system to a first client device associated with a first user of a content management system. As described above, the process for transmitting the content item and the third-party code may involve the content item being transmitted via a primary domain of the content management system and the third-party code being transmitted via a secondary domain of the content management system.

As the third-party code is executed by the first client device, additional data may be generated and transmitted to the content management system. At operation 710, the content management system may receive the data associated with the third-party code from the first client device and store the data as metadata associated with the content item at operation 715.

At operation 720, the content management system updates other client devices with access to the content item by transmitting a notification regarding the data to at least one other client device associated with another user of the content management system with access to the content item.

According to one embodiment, the notification may be transmitted to other client devices currently accessing the content item and the notification may include code that, when executed by the other client devices, may cause the other client devices to request the updated data. In other embodiments, the notification may include the updated data. The updated data may then be passed by the client devices to the third-party code running on the client devices via postMessages.

Figure 8:
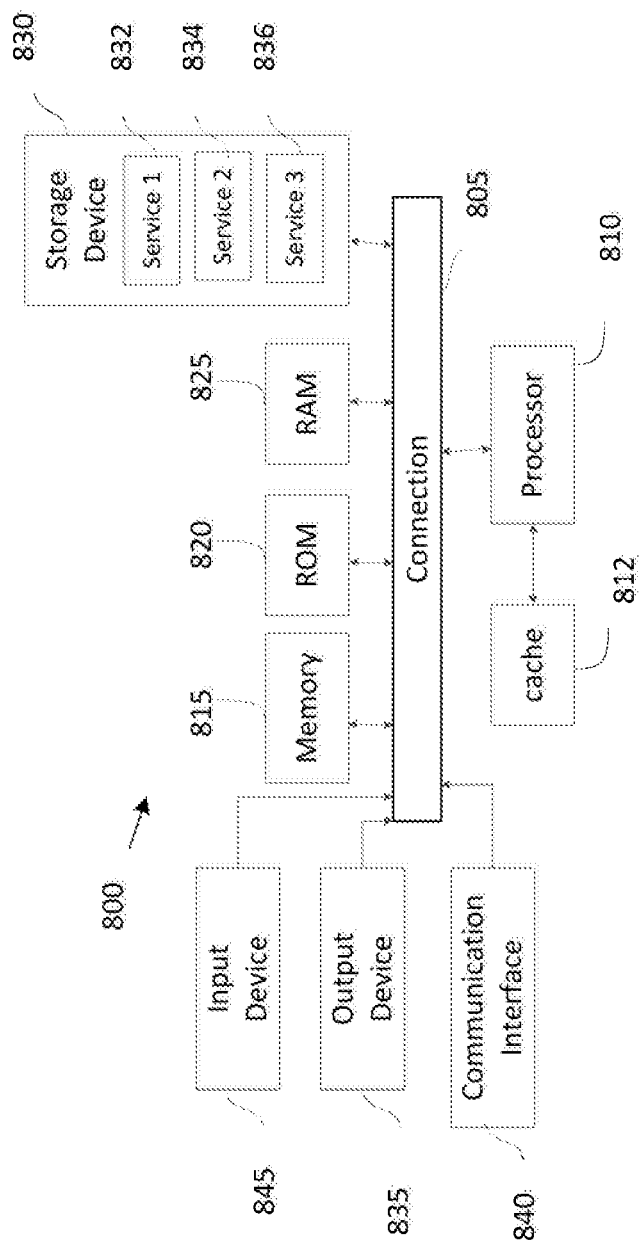
FIG. 8 shows an example of a system for implementing certain aspects of the present technology.

FIG. 8 shows an example of computing system 800 in which the components of the system are in communication with each other using connection 805. Connection 805 can be a physical connection via a bus, or a direct connection into processor 810, such as in chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
    storing, by a content management system, credentials for an external user account of a third-party source that is external to the content management system, wherein the credentials are required to display third-party content embedded into a content item stored on the content management system, the credentials are stored in association with the content item;
    receiving, from a client device, a request to receive the content item that is associated with a first domain of the content management system;
    receiving, from the client device, a request for third-party code based on a portion of the content item, the third-party code associated with a second domain of the content management system;
    providing the client device with the third-party code associated with the second domain of the content management system, wherein the third-party code references data associated with the third-party content;
    receiving, from the client device, a client request for the data associated with the third-party content embedded into the content item, the data stored at the third-party source;
    retrieving the credentials for the external user account from the content management system;
    sending, to the third-party source, a proxy-request for the data associated with the external user account, wherein the proxy-request comprises the credentials and parameters associated with the client request;
    receiving, from the third-party source, the data associated with the third-party content embedded into the content item, based on confirmation of the credentials of the external user account; and
    sending, to the client device, the data for the embedded content to be displayed with the content item.

2. The computer-implemented method of claim 1, wherein the client request is associated with a first user of the content management system and the external user account is associated with a second user of the content management system.

3. The computer-implemented method of claim 1, further comprising participating in a 3-legged OAuth registration process to obtain the credentials.

4. The computer-implemented method of claim 1, further comprising:
    sending, to the client device, the content item and the third-party code stored by the content management system;
    receiving, from the client device, data associated with the third-party code;
    storing the data as metadata associated with the content item; and sending a notification regarding the data to a second client device with access to the content item.

5. The computer-implemented method of claim 4, wherein a portion of the content item that references the data comprises an iframe.

6. The computer-implemented method of claim 1, wherein at least one of the parameters are provided by the client request.

7. The computer-implemented method of claim 1, wherein the content item is a collaboration document.

8. The computer-implemented method of claim 1, wherein the data associated with the external user account comprises at least one of a picture, a video, a document, an audio file or a widget.

9. The computer-implemented method of claim 1, wherein a triggering action links a user account associated with the content item in the content management system with the user account of the third-party source.

10. The computer-implemented method of claim 1, wherein the content item is managed by the content management system with the external user account.

11. A non-transitory computer readable medium comprising instructions, the instructions, when executed by a computing system, cause the computing system to:
obtain, by a content management system, credentials for an external user account of a third-party source that is external to the content management system, wherein the credentials are required to display third-party content embedded into a content item stored on the content management system, the credentials stored in association with the content item;
receive, from a client device, a request to receive the content item that is associated with a first domain of the content management system;
receive, from the client device, a request for third-party code based on a portion of the content item, the third-party code associated with a second domain of the content management system;
provide the client device with the third-party code associated with the second domain of the content management system, wherein the third-party code references data associated with the third-party content;
receive, from the client device, a client request for the data associated with the third-party content embedded into the content item, the data stored at the third-party source;
send, to the third-party source, a proxy-request for the data associated with the external user account, wherein the proxy-request comprises the credentials;
receive, from the third-party source, the data associated with the third-party content embedded into the content item based on confirmation of the credentials of the external user account; and
forward, to the client device, the data for the embedded content to be displayed with the content item.

12. The non-transitory computer readable medium of claim 11, wherein the instructions further cause the computing system to participate in an authentication process to obtain the credentials.

13. The non-transitory computer readable medium of claim 12, wherein the authentication process is a 3-legged OAuth registration process.

14. The non-transitory computer readable medium of claim 12, wherein the client request is associated with a first user of the content management system and the external user account is associated with a second user of the content management system.

15. The non-transitory computer readable medium of claim 14, wherein the authentication process included participation from the second user of the content management system.

16. A system comprising:
one or more processors; and
a non-transitory computer-readable medium storing instructions that, when executed by the one or more processors, cause the one or more processors to:
obtain, by a content management system, credentials for an external user account of a third-party source that is external to the content management system, wherein the credentials are required to display third-party content embedded into a content item are stored on the content management system;
receive, from a client device, a request to receive the content item that is associated with a first domain of the content management system;
receive, from the client device, a request for third-party code based on a portion of the content item, the third-party code associated with a second domain of the content management system;
provide the client device with the third-party code associated with the second domain of the content management system, wherein the third-party code references data associated with the third-party content;
receive, from the client device, a client request for the data associated with the third-party content embedded into the content item, the data stored at the third-party source;
send, to the third-party source, a proxy-request for the data associated with the external user account, wherein the proxy-request comprises the credentials;
receive, from the third-party source, the data associated with the third-party content embedded into the content item based on confirmation of the credentials of the external user account; and
send, to the client device, the data for the embedded content to be displayed with the content item.

17. The system of claim 16, wherein the instructions further cause the one or more processors to participate in an authentication process to obtain the credentials.

18. The system of claim 17, wherein the authentication process is a 3-legged OAuth registration process.

19. The system of claim 17, wherein the client request is associated with a first user of the content management system and the external user account of the third-party source is associated with a second user of the content management system.

20. The system of claim 19, wherein the authentication process included participation from the second user of the content management system.

21. The system of claim 19, wherein the content item is a collaboration document.

* * * * *